US008570991B2

(12) United States Patent
Shinozaki

(10) Patent No.: US 8,570,991 B2
(45) Date of Patent: Oct. 29, 2013

(54) WIRELESS COMMUNICATIONS SYSTEM, WIRELESS TERMINAL DEVICE, INDOOR BASE STATION APPARATUS, AND CONTROL APPARATUS FOR OBTAINING LOCATION INFORMATION

(75) Inventor: Atsushi Shinozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 966 days.

(21) Appl. No.: 12/330,196

(22) Filed: Dec. 8, 2008

(65) Prior Publication Data
US 2009/0233574 A1    Sep. 17, 2009

(30) Foreign Application Priority Data

Mar. 14, 2008   (JP) ................................ 2008-066197

(51) Int. Cl.
*H04M 11/04*    (2006.01)
(52) U.S. Cl.
USPC .......................................... 370/338; 370/324
(58) Field of Classification Search
USPC ......... 370/338, 310.2, 324; 455/404.2, 456.1, 455/435.1, 403
See application file for complete search history.

(56) References Cited

U.S. PATENT DOCUMENTS

| | | | |
|---|---|---|---|
| 7,035,637 B2 | 4/2006 | Motegi et al. | |
| 7,053,826 B1 | 5/2006 | McBurney | |
| 8,274,947 B1 * | 9/2012 | Fang et al. | 370/331 |
| 2005/0181805 A1 | 8/2005 | Gallagher | |
| 2007/0105527 A1 * | 5/2007 | Nylander et al. | 455/403 |
| 2007/0155399 A1 | 7/2007 | Alberth, Jr. | |
| 2007/0184845 A1 | 8/2007 | Troncoso | |
| 2008/0267114 A1 * | 10/2008 | Mukherjee et al. | 370/315 |

FOREIGN PATENT DOCUMENTS

| | | | |
|---|---|---|---|
| JP | 2001-238245 A | 8/2001 | |
| JP | 2003174665 A | 6/2003 | |
| JP | 2004-343431 A | 12/2004 | |
| JP | 2008182660 A | 8/2008 | |
| WO | 2007015067 A2 | 2/2007 | |

OTHER PUBLICATIONS

Special Report (Overseas Trend, Wireless Lan, Telecom Technology) "3GSM Offers Nouvelle Vague of Telecom Service "FEMTO CELL" Changes FMC", Nikkei Communications 2007, dated Mar. 15 issue, pp. 69-75 with full English Language Translation pp. 1-20.
European Search Report issued in European Patent Application 08171016.2-2413 (dated Aug. 18, 2009).

(Continued)

*Primary Examiner* — Ian N. Moore
*Assistant Examiner* — Thai Nguyen
(74) *Attorney, Agent, or Firm* — Smith, Gambrell & Russell, LLP

(57) ABSTRACT

A wireless terminal device including a time information obtaining part configured to obtain time information indicative of a period of time the wireless terminal device is unable to communicate with a first base station apparatus, a storing part configured to store peripheral cell information in correspondence with the time information, the peripheral cell information including an identifier for identifying a peripheral cell located in a periphery of a first cell in which the wireless terminal device is located before becoming unable to communicate with the first base station apparatus, and a reporting part configured to report the peripheral cell information and the time information to a second base station apparatus capable of communicating with the wireless terminal device.

4 Claims, 12 Drawing Sheets

(56) References Cited

OTHER PUBLICATIONS

Airvana: "Tutorial on Femtocell Technology and SIP/IMS-based Femto Network Architectures" Oct. 15, 2007, pp. 1-68, XP002539797.

Japanese Notification of Reasons for Refusal dated Jul. 10, 2012 issued in application No. 2008-066197.

Japanese Office Action dated Aug. 13, 2013 issued in Japanese Patent Application No. 2012-184777.

* cited by examiner

WIRELESS COMMUNICATIONS SYSTEM, WIRELESS TERMINAL DEVICE, INDOOR BASE STATION APPARATUS, AND CONTROL APPARATUS FOR OBTAINING LOCATION INFORMATION

BACKGROUND OF THE INVENTION

1. Field of the Invention

The present invention generally relates to a wireless communications system, and more particularly to a wireless terminal device, an indoor base station apparatus, and a control apparatus.

2. Description of the Related Art

An emergency alert location notification is a function for transmitting information regarding a location from which an emergency alert is transmitted to an emergency alert receiving institution in a case where the emergency is alerted to the police department (Phone No. 110), the fire department (Phone No. 119), or the coast guard (Phone No. 118) by a mobile telephone.

In a case where there is an emergency alert, a mobile communications carrier must gather location information from a party transmitting the emergency alert and provide the information to an emergency alert receiving institution such as the police department, the coast guard, and the fire department. This emergency alert location notification has been obligated in Japan from April of 2007.

In order to obtain location information from the transmitting party, location information obtained from a GPS (Global Positioning System) or information of the location where a base station apparatus is positioned are used. In a case where a mobile phone is located in an environment capable of receiving GPS signals, the reception of GPS signals by the mobile phone allows the mobile communications carrier to identify the location of the mobile phone and provide information of the identified location to the emergency alert receiving institution.

In providing location information during an emergency in other countries, the United States, for example, provides location information according to E911 (Enhanced 911). In the United States, it is obligatory to provide information identifying the location of a transmitting party to a Public Safety Answering Point (PSAP) which is an institution for receiving 911 calls.

In recent years, femtocell has been considered to be used for providing mobile phone service areas. Femtocell is a communications area (cell) that is covered by a very small base station apparatus with extremely small output. The femtocell covers an area with, for example, a radius of approximately several tens of meters. In the femtocell, a base station apparatus may also be referred to as an indoor small base station. In the femtocell, a Femtocell Gateway (FGW) which is a femto dedicated gateway installed by a mobile phone communications carrier and a femtocell Access Point (femtoAP) which is a femtocell dedicated small indoor base station are connected by using an IP broadband line. For example, the IP broadband line may be Asymmetric Digital Subscriber Line (ADSL) or Fiber To The Home (FTTH). The femtocell can provide a better radiowave reception environment than a macrocell. Further, the femtocell can provide a high speed data communications environment. Further, the femtocell can allow a specific user to exclusively use a frequency, to thereby improve frequency usage efficiency. Various services using femtocell (hereinafter also referred to as femtocell service) are being considered by mobile phone communications carriers. The femtocell service includes, for example, a fixed-fee service.

The femtocell service can easily be obtained in an environment where IP broadband lines are installed. For example, by connecting an IP broadband line to a femtocell dedicated small indoor base station, the femtocell service can easily be obtained. Further, the femtocell dedicated small indoor base station can be installed in a user's residence receiving the femtocell service. This alleviates management constraints of mobile phone communications carriers. For example, the user may be able to freely change the location of the small indoor base station. In another example, the user may be able to freely turn the power of the small indoor base station on and off.

Since the user can freely move the location of the small indoor base station, managing the location of the small indoor base station may be a problem for the mobile phone communications carrier.

For example, a user purchases or borrows a small indoor base station from a mobile phone communications carrier. Then, the user installs the small indoor base station. The user may then change the installment location of the small indoor base station. For example, the location of the installment location may be changed in a case where the user moves to another residence. In this case, the method of managing the location of the small indoor base station may become a problem for the mobile phone communications carrier.

As described above, the mobile communications carrier identifies the location of a mobile phone receiving GPS signals and provides information of the identified location of the mobile phone to an emergency alert institution. Further, the mobile communications carrier may also provide location information of a fixed base station apparatus communicating with the mobile phone to the emergency alert institution.

A case where a user is located in an environment capable of receiving a femtocell service is described below. That is, in this case, a location of a mobile phone is registered in a service area provided by radiowaves transmitted from a small indoor base station. In a case where an emergency alert is sent where a mobile phone is in an environment capable of receiving GPS signals, the location identified by GPS signals can be reported to the mobile phone communications carrier. However, a problem occurs when the mobile phone is in an environment unable to receive GPS signals as described below.

In a case where a mobile phone is in an environment unable to receive GPS signals, the mobile phone communications carrier provides location information of a visited cell when a radiowave is transmitted by the mobile phone. In the field of mobile phone services, a cell is commonly understood as an area in which radiowaves are transmitted from a base station apparatus. Further, mobile phone communications carriers are required to manage location information of base station apparatuses. However, as described above, small indoor base stations are expected to have their locations changed by the user. Further, the small indoor base stations are also expected to be used in an environment where absolutely no outside radiowaves can reach. Therefore, in a case of emergency, the small indoor base station itself is to identify its location so that location information of the mobile phone can be provided to the emergency receiving institution.

However, there may be a case where the small indoor base station is in an environment unable to receive not only GPS signals but also radiowaves from a macro-cell neighboring the area at which the small indoor base station can receive radiowaves. The macro-cell is an outside cell capable of covering a radius of 1 km. In such a case, it is difficult for a mobile communications carrier to manage, for example, information of the neighboring cell along with location information of the small indoor base station.

In a case where an emergency alert is transmitted from a mobile phone located within a cell of the small indoor base station situated in such an environment, the mobile communications carrier cannot identify the location of the small indoor base station. Thus, the mobile communications carrier cannot provide location information to an emergency receiving institution. This adversely affects emergency operations.

SUMMARY OF THE INVENTION

The present invention may provide a wireless communications system, a wireless terminal device, an indoor base station apparatus, and a control apparatus that substantially obviate one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a wireless communications system, a wireless terminal device, an indoor base station apparatus, and a control apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a wireless terminal device including: a time information obtaining part configured to obtain time information indicative of a period of time the wireless terminal device is unable to communicate with a first base station apparatus; a storing part configured to store peripheral cell information in correspondence with the time information, the peripheral cell information including an identifier for identifying a peripheral cell located in a periphery of a first cell in which the wireless terminal device is located before becoming unable to communicate with the first base station apparatus; and a reporting part configured to report the peripheral cell information and the time information to a second base station apparatus capable of communicating with the wireless terminal device.

Furthermore, another embodiment of the present invention provides an indoor base station apparatus including: a location information obtaining part configured to obtain location information indicative of a location in which the indoor base station apparatus is located; and a location registration requesting part configured to transmit a location registration request to an upper level apparatus; wherein when the location information obtaining part obtains the location information, the location registration requesting part transmits the location registration request including the obtained location information.

Furthermore, another embodiment of the present invention provides a controlling apparatus for obtaining location information of a wireless terminal device in accordance with a location request from an upper level apparatus in response to an emergency alert transmitted from the wireless terminal device, the controlling apparatus including: an indoor base station location determining part configured to identify an indoor base station apparatus covering an area in which the wireless terminal device is located and determine whether location information of the identified indoor base station apparatus can be obtained; a wireless terminal location determining part configured to determine whether location information of the wireless terminal device can be obtained in a case where the indoor base station location determining part determines that the location information of the identified indoor base station apparatus cannot be obtained; a location information obtaining part configured to obtain location information based on determination results of the indoor base station location determining part or the wireless terminal location determining part; and a location response generating part configured to generate a location response including the location information obtained by the location information obtaining part.

Furthermore, another embodiment of the present invention provides a wireless communications system for obtaining location information of a wireless terminal device in response to an emergency alert transmitted from the wireless terminal device, the wireless communications system including: an upper level apparatus configured to receive the emergency alert and transmit a location request based on the emergency alert; and a control apparatus configured to receive the location request and transmit a location response to the upper level apparatus, the control apparatus including an indoor base station location determining part configured to identify an indoor base station apparatus covering an area in which the wireless terminal device is located and determine whether location information of the identified indoor base station apparatus can be obtained, a wireless terminal location determining part configured to determine whether location information of the wireless terminal device can be obtained in a case where the indoor base station location determining part determines that the location information of the identified indoor base station apparatus cannot be obtained, a location information obtaining part configured to obtain location information based on determination results of the indoor base station location determining part or the wireless terminal location determining part, and a location response generating part configured to generate the location response including the location information obtained by the location information obtaining part.

Furthermore, another embodiment of the present invention provides a method for obtaining location information of a wireless terminal device in response to an emergency alert transmitted from the wireless terminal device, including the steps of: a) transmitting a location request based on the emergency alert; b) identifying an indoor base station apparatus covering an area in which the wireless terminal device is located based on the location request; c) determining whether location information of the identified indoor base station apparatus can be obtained; d) determining whether location information of the wireless terminal device can be obtained in a case where step c) determines that the location information of the identified indoor base station apparatus cannot be obtained; e) obtaining location information based on determination results of step c) or step d); f) generating a location response including the location information obtained in step e); and g) transmitting the location response to an upper level apparatus.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

First Embodiment

Figure 1:
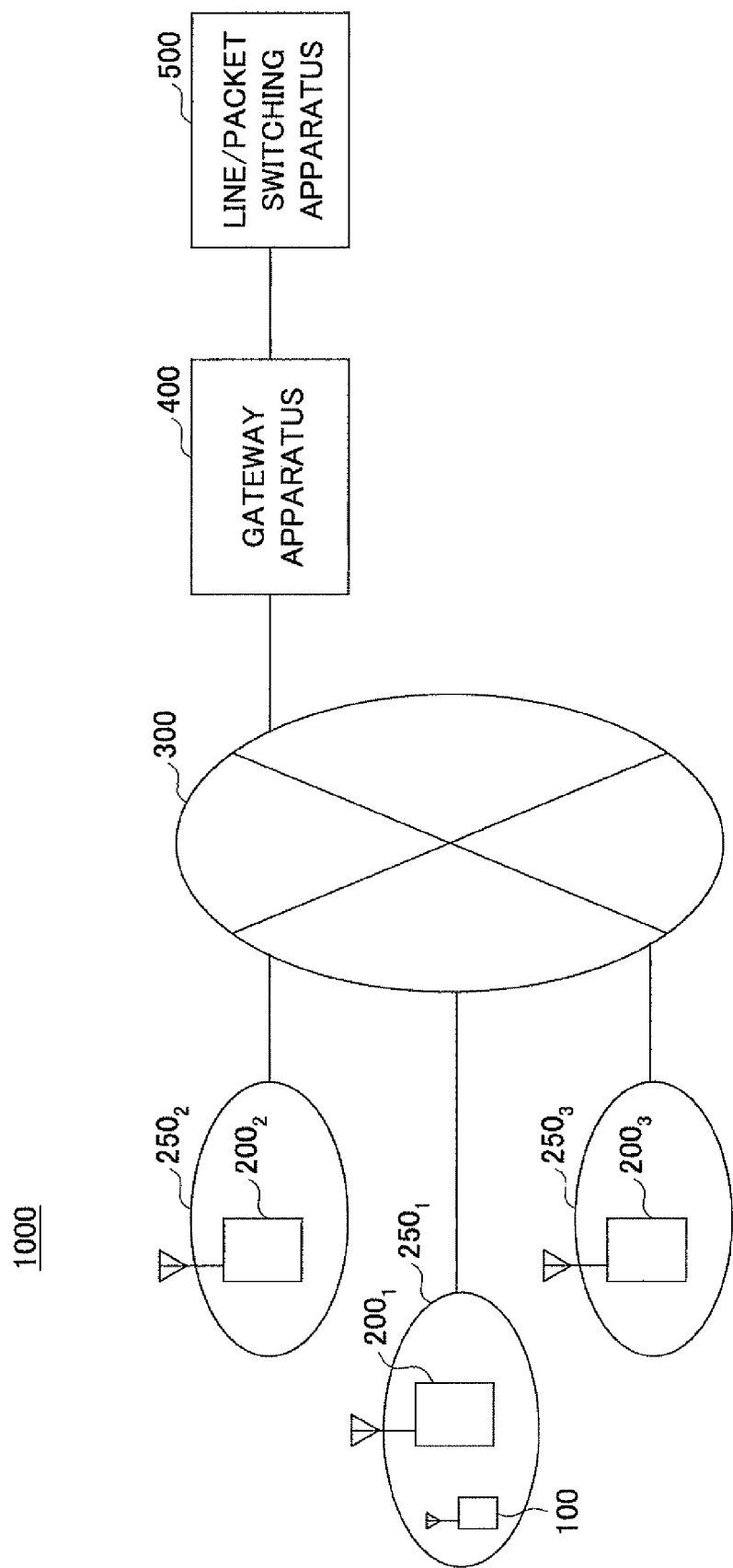
FIG. 1 is a schematic diagram illustrating a wireless communications system according to an embodiment of the present invention.

First, a wireless communications system 1000 according to an embodiment of the present invention is described with reference to FIG. 1.

The wireless communications system 1000 includes a wireless terminal device 100 and an indoor base station apparatus 200 (2001, 2002, 2003). The wireless terminal device 100 is configured to conduct wireless communications with the indoor base station apparatus 200 (2001, 2002, 2003). The wireless terminal device 100 may include a GPS receiver.

The indoor base station apparatus 200 is connected to a gateway apparatus 400 via a communications network 300. The communications network 300 includes, for example, an IP network or a mobile communications network. The indoor base station 200 is installed indoors (e.g., user's residence). The indoor base station 200 includes, for example, a small base station. The small base station may also be referred to as a Femtocell Access Point (femtoAP). The indoor base station 200 may include a GPS receiver.

The wireless communications system 1000 also includes the gateway apparatus 400 which acts as a control apparatus. The gateway apparatus 400 manages location information of the indoor base station apparatus 200 and the wireless terminal device 100. The gateway apparatus 400 is also connected to a line/packet switching apparatus 500. The line/packet switching apparatus 500 includes a Mobile Switching Center (MSC). The line/packet switching apparatus 500 also includes a Serving General Packet Radio Service (SGSN) Support Node (SGSN). The SGSN manages user information of mobile users within its area. The user information includes, for example, information of Quality of Service (QoS) service class that can be provided, link (connection) destination information, and authentication information.

Figure 2:
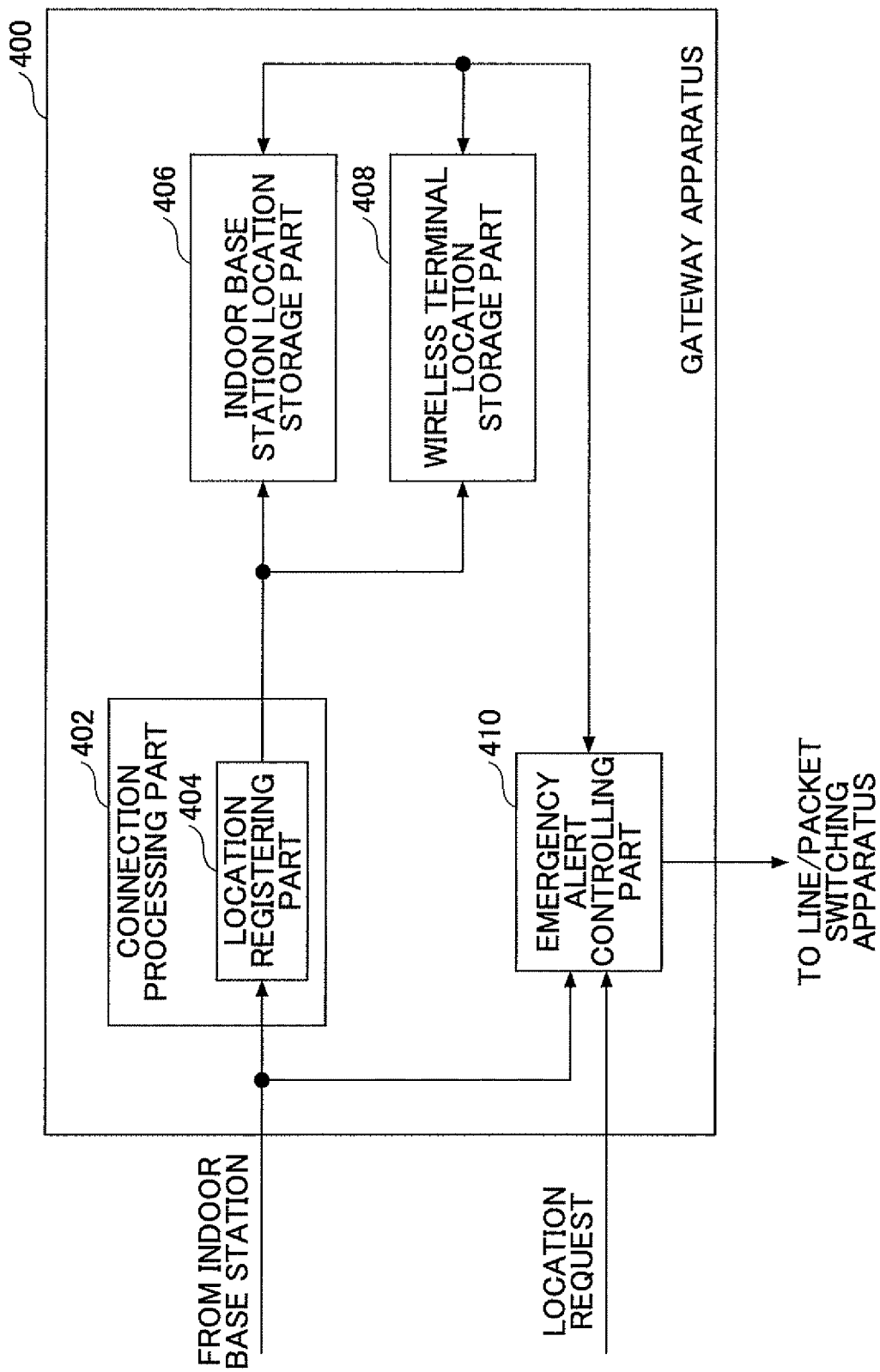
FIG. 2 is a block diagram illustrating a gateway apparatus according to an embodiment of the present invention.

Next, the gateway apparatus 400 according to an embodiment of the present invention is described with reference to FIG. 2.

The gateway apparatus 400 includes a connection processing part 402. In a case where the indoor base station apparatus 200 connects to the communications network 300, the connection processing part 402 performs a connection process between the indoor base station apparatus 200. For example, the connection processing part 402 performs a connection process according to IP sec (Security Architecture for Internet Protocol). IP sec is a protocol for providing a data-tamper proof function or a spy proof function in IP packet units by using encryption technology. By using IP sec, the content of communications can be prevented from being tampered with or spied on between communication paths even of using a transport or an application that are not accommodated with encryption technology. Other than providing integrity with an Authentication Header (AH), an authentication mechanism, and a security program for data encryption according to Encapsulated Security Payload (ESP), the IP sec also provides, for example, a key exchanging function according to an Internet Key Exchange (IKE) protocol. For example, the connection processing part 402 is configured to assign an IP address to the indoor base station apparatus 200 in the connection process according to IP sec. In one example, an IP address distributed by a Dynamic Host Configuration Protocol (DHCP) server may be assigned to the indoor base station apparatus 200.

The gateway apparatus 400 includes a location registering part 404. The location registering part 404 stores (registers) location registration information of the indoor base station apparatus 200 to a below-described indoor base station location storage part 406. The location registration information includes an identifier(s) that is unique to the indoor base station apparatus 200 (indoor base station unique ID). The unique identifier of the indoor base station apparatus 200 may be, for example, a MAC (Media Access Control) address of the indoor base station apparatus 200. In a case where a U-SIM (Universal Subscriber Identity Module) card is included in the indoor base station apparatus 200, an IMSI (International Subscriber Identifier) stored in the U-SIM card may be used as the unique identifier of the indoor base station apparatus 200. Further, the location registration information may also include an IP address distributed to the indoor base station apparatus 200 from the above-described DHCP server.

In a case where a user purchases or rents the indoor base station 200, the user is to report (declare) the location where the indoor base station 200 is to be installed. For example, the location may be the address of the user. Thus, the location registration information may include a user address reported (declared) to a communications carrier when a user purchases the indoor base station apparatus 200 from the communications carrier. Further, the location registration information may also include a user address reported (declared) to a communications carrier when a user rents the indoor base station apparatus 200 from the communications carrier. The communications carrier stores the reported location in correspondence with the unique identifier of the indoor base station apparatus 200. This process of storing the location may be conducted before the indoor base station apparatus 200 is connected to the gateway apparatus 400. Further, the location registration information may include location information identified by a GPS signal received by the indoor base station apparatus 200. Further, the location registration information may include peripheral cell information received from the indoor base station apparatus 200.

The location registering part 404 also stores (registers) location registration information of the wireless terminal device 100 that is located in an area covered by the indoor base station apparatus 200. The location registering part 404 stores the location registration of the wireless terminal device 100 in a below-described wireless terminal location storage part 408. The location registration information includes an identifier(s) that is unique to the wireless terminal device 100 (wireless terminal unique ID). The unique identifier of the wireless terminal device 100 may be, for example, a MAC (Media Access Control) address of the wireless terminal device 100. In a case where a U-SIM card is included in the wireless terminal device 100, an IMSI stored in the U-SIM card may be used as the unique identifier of the wireless terminal device 100.

Further, the location registration information of the wireless terminal device 100 may include peripheral cell information received from the wireless terminal device 100. For example, the location registration information may include peripheral cell information and time information reported from the wireless terminal device 100. The peripheral cell information included in the location registration information may include the newest (latest) peripheral cell information among the peripheral cell information obtained from the wireless terminal device 100. The peripheral cell information may include peripheral cell information received from a cell where the wireless terminal device 100 was located before moving to the area covered by the indoor base station apparatus 200. The time information may be the time in which the newest peripheral cell information is obtained. From the aspect of having the gateway apparatus 400 determine the validity of the peripheral cell information based on the time information, it is preferable that the time information be the time in which the wireless terminal device 100 has moved out of the cell that has obtained the peripheral cell information. For example, after peripheral information is received from another cell, there is a case where communication between the wireless terminal device 100 is reestablished after communication with the wireless terminal device 100 is lost due to the wireless terminal device 100 moving out of the other cell. In this case, it is preferable to obtain time information indicating the time in which the wireless terminal device 100 has moved out of the other cell.

Further, the location registration information may include information of a cell in which the wireless terminal device 100 was formerly located (former cell information). For example, the location registration information may include the former cell information and time information. The former cell information may include the newest (latest) former cell information among the former cell information corresponding to the cells in which the wireless terminal device 100 was formerly located. For example, the former cell information may be information of a cell in which the wireless terminal device 100 was located before moving to an area covered by the indoor base station apparatus 200. Further, the time information may include the time in which the wireless terminal device 100 was located in the cell corresponding to the newest former cell information. From the aspect of having the gateway apparatus 400 determine the validity of the former cell information based on the time information, it is preferable that the time information be the time in which the wireless terminal device 100 has moved out of the former cell. For example, in a case where the wireless terminal device 100 is located in another cell, there is a case where communication between the wireless terminal device 100 is reestablished after communication with the wireless terminal device 100 is lost due to the wireless terminal device 100 moving out of the other cell. In this case, it is preferable to obtain time information indicating the time in which the wireless terminal device 100 has moved out of the other cell.

Further, the location registration information may include location information identified according to a GPS signal received by the wireless terminal device 100. The location registration information may also include an identifier of a cell in which the wireless terminal device 100 is located (e.g., cell ID). In this case, the location registration information may include the identifier of the cell in correspondence with an IP address. In a case where the wireless terminal device 100 requests location registration directly to the gateway apparatus 400, the IP address of the wireless terminal device 100 becomes the IP address. Further, in a case where the wireless terminal device 100 requests location registration to the indoor base station apparatus 200, the IP address of the indoor base station apparatus 200 becomes the IP address.

Figure 3:
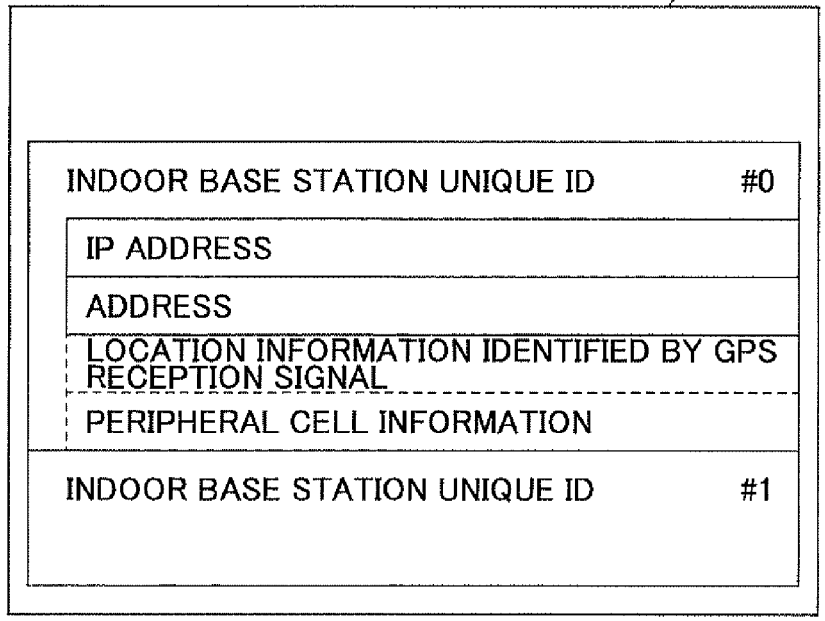
FIG. 3 is a schematic diagram illustrating information included in an indoor base station location storage part according to an embodiment of the present invention.

The gateway apparatus 400 further includes the indoor base station location storage part 406. The indoor base station location storage part 406 stores location registration information input from the location registering part 404. The location registration information stored in the indoor base station location storage part 406 of the gateway apparatus 400 includes location registration information corresponding to each indoor base station apparatus 200 connected to the gateway apparatus 400 itself. For example, as shown in FIG. 3, the indoor base station location storage part 406 stores location registration information of each indoor base station apparatus 200. The location registration information of each indoor base station apparatus 200 includes the unique identifier (ID) of the indoor base station apparatus 200. The location registration information of each indoor base station apparatus 200 includes the IP address corresponding to each indoor base station apparatus 200. The location registration information of each indoor base station apparatus 200 also includes the address where the indoor base station apparatus 200 is installed (indoor base station address). The indoor base station address is the address declared (reported) to the communications carrier when the user purchases or rents the indoor base station from the communications carrier. The location registration information of each indoor base station apparatus 200 may also include location information identified according to a GPS signal received by the indoor base station apparatus 200. Further, the location registration information of each indoor base station apparatus 200 may include peripheral cell information received from the indoor base station apparatus 200. In the indoor base station location storage part 406, plural kinds of information are associated to the unique identifier of each indoor base station apparatus 200. That is, the above-described information (e.g., IP address, address) are stored in the indoor base station location storage part 406 in correspondence with the unique identifier of each indoor base station apparatus 200. Since there may be a case where the location information identified by a GPS reception signal and the peripheral cell information cannot be obtained from the indoor base station apparatus 200, the portion corresponding to the location information identified by a GPS reception signal and the peripheral cell information are depicted with broken lines in FIG. 3.

Figure 4:
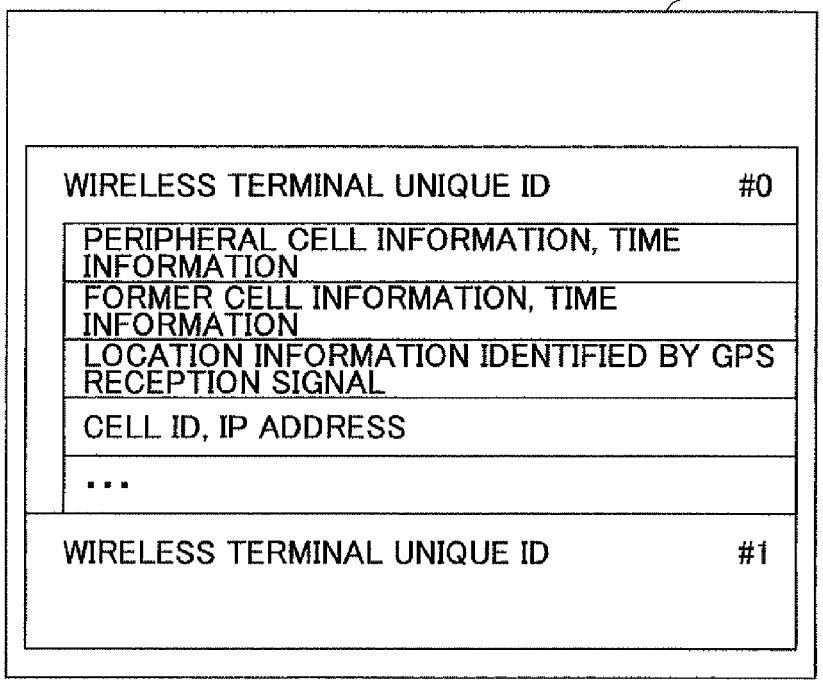
FIG. 4 is a schematic diagram illustrating information included in a wireless terminal location storage part according to an embodiment of the present invention.

The gateway apparatus 400 further includes the wireless terminal location storage part 408. The wireless terminal location storage part 408 stores location registration information input from the location registering part 404. The location registration information stored in the wireless terminal location storage part 408 of the gateway apparatus 400 includes location registration information corresponding to each wireless terminal device 100 located in an area covered by the indoor base station apparatus 200 connected to the gateway apparatus 400 itself. For example, as shown in FIG. 4, the wireless terminal location storage part 408 stores location registration information of each wireless terminal device 100. The location registration information of each wireless terminal device 100 includes the unique identifier (ID) of the wireless terminal device 100 (wireless terminal device unique ID). The location registration information of each wireless terminal device 100 includes peripheral cell information and time information reported from each wireless terminal device 100. Further, the location registration information of each wireless terminal device 100 includes former cell information and time information reported from each wireless terminal device 100. Further, the location registration information of each wireless terminal device 100 may also include location information identified according to a GPS signal received by each wireless terminal device 100. Further, the location registration information of each wireless terminal device 100 may include an identifier of a cell in which the wireless terminal device 100 (e.g., cell ID) is located. Further, in correspondence with the cell ID, the location registration information of each wireless terminal device 100 may also include an IP address of the wireless terminal device 100 or the indoor base station 200 reporting (notifying) the cell ID. In the wireless terminal device location storage part 408, plural kinds of information are associated to the unique identifier of each wireless terminal device 100. That is, the above-described information (e.g., IP address, cell ID) are stored in the wireless terminal location storage part 408 in correspondence with the unique identifier of each wireless terminal device 100. The wireless terminal location storage part 408 may be configured to store either a combination of the peripheral cell information and corresponding time information or a combination of the former cell information and corresponding time information.

The gateway apparatus 400 further includes an emergency alert controlling part 410. In a case where the wireless terminal device 100 transmits an emergency alert, the emergency alert controlling part 410 performs controls for reporting information regarding the location from which the emergency alert is transmitted. For example, in a case where an emergency alert is transmitted from the wireless terminal device 100, the line/packet switching apparatus 500 requests for location information to the gateway apparatus 400. In accordance with the location request from the line/packet switching apparatus 500, the emergency alert controlling part 410 identifies the indoor base station apparatus 200 covering the area in which the wireless terminal device 100 transmitting the emergency alert is located. The emergency alert controlling part 410 refers to the indoor base station location storage part 406 and determines whether corresponding indoor base station location information identified by a GPS reception signal is stored in the indoor base station location storage part 406. In a case where the emergency alert controlling part 410 determines that location information of the corresponding indoor base station apparatus 200 identified by the GPS reception signal is stored in the indoor base station location storage part 406, the emergency alert controlling part 410 reports the location information to the line/packet switching apparatus 500. The line/packet switching apparatus 500 reports the location information reported from the gateway apparatus 400 to the emergency alert receiving institution.

In a case where the emergency alert controlling part 410 determines that location information of the corresponding indoor base station apparatus 200 identified by the GPS reception signal is not stored in the indoor base station location storage part 406, the emergency alert controlling part 410 determines whether peripheral cell information corresponding to the identified indoor base station apparatus 200 is stored. In a case where the emergency alert controlling part 410 determines that peripheral cell information corresponding to the identified indoor base station apparatus 200 is stored, the emergency alert controlling part 410 estimates the location of the indoor base station 200 based on the peripheral cell information and reports the estimated location information to the line/packet switching apparatus 500. The line/packet switching apparatus 500 reports the location information reported from the gateway apparatus 400 to the emergency alert receiving institution.

In a case where the emergency alert controlling part 410 determines that peripheral cell information corresponding to the identified indoor base station apparatus 200 is not stored, the emergency alert controlling part 410 refers to the wireless terminal location storage part 408 and determines whether corresponding wireless terminal device location information identified by a GPS reception signal is stored in the wireless terminal location storage part 408. In a case where the emergency alert controlling part 410 determines that location information of the corresponding wireless terminal device 100 identified by the GPS reception signal is stored in the wireless terminal location storage part 408, the emergency alert controlling part 410 reports the location information to the line/packet switching apparatus 500. The line/packet switching apparatus 500 reports the location information reported from the gateway apparatus 400 to the emergency alert receiving institution.

In a case where the emergency alert controlling part 410 determines that location information of the corresponding wireless terminal device 100 identified by the GPS reception signal is not stored in the wireless terminal location storage part 408, the emergency alert controlling part 410 determines whether a cell ID of a cell in which the wireless terminal device 100 is located and an IP address of an apparatus reporting the cell ID are stored. In a case where the emergency alert controlling part 410 determines that the cell ID in which the wireless terminal device 100 is located and the IP address of the apparatus reporting the cell ID are stored, the emergency alert controlling part 410 estimates the location of the wireless terminal device 100 according to the stored cell ID and the stored IP address and reports the estimated location information to the line/packet switching apparatus 500. The line/packet switching apparatus 500 reports the location information reported from the gateway apparatus 400 to the emergency alert receiving institution.

In a case where the emergency alert controlling part 410 determines that the cell ID in which the wireless terminal device 100 is located and the IP address of the apparatus reporting (notifying) the cell ID are not stored, the emergency alert controlling part 410 determines whether peripheral cell information and/or former cell information and time information reported from the wireless terminal device 100 are stored. In a case where the emergency alert controlling part 410 determines that the peripheral cell information and/or former cell information and time information reported from the wireless terminal device 100 are stored, the emergency controlling part 410 determines whether a movable distance of the wireless terminal device 100 is within a radius of the cell of the indoor base station 200 based on the time information. The predetermined movable distance is, for example, the distance in which the wireless terminal device 100 can move starting from the time indicated by the time information. In a case where the emergency alert controlling part 410 determines that the movable distance is within the cell radius, the emergency controlling part 410 estimates the location of the indoor base station apparatus 200 based on the peripheral cell information and/or the former cell information and reports the estimated location information to the line/packet switching apparatus 500. The line/packet switching apparatus 500 reports the location information reported from the gateway apparatus 400 to the emergency alert receiving institution. In a case where the emergency alert controlling part 410 determines that the peripheral cell information and/or former cell information and time information reported from the wireless terminal device 100 are not stored or in a case where the emergency alert controlling part 410 determines that the movable distance is beyond the cell radius, the emergency alert controlling part 410 reports that the location cannot be identified to the line/packet switching apparatus 500. Based on the report from the gateway apparatus 400, the line/packet switching apparatus 500 reports that the location cannot be identified to the emergency alert receiving institution.

Figure 5:
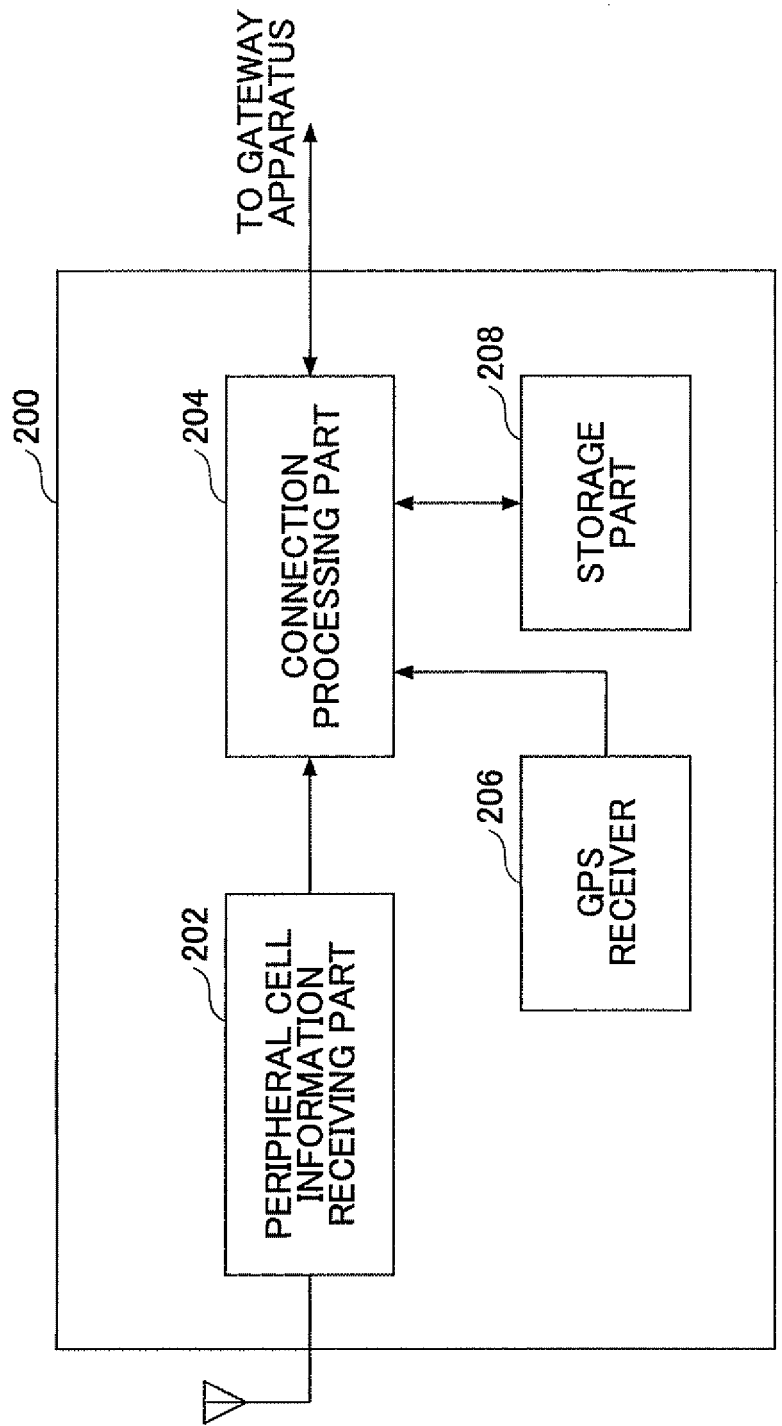
FIG. 5 is a block diagram illustrating an indoor base station apparatus according to an embodiment of the present invention.

Next, the indoor base station apparatus 200 according to an embodiment of the present invention is described with reference to FIG. 5. The indoor base station apparatus 200 includes a peripheral cell information receiving part 202. The peripheral cell information receiving part 202 receives report information (notification information) transmitted from a base station located in the periphery of the indoor base station apparatus 200 itself. For example, the report information includes an ID of a cell that is covered by the base station apparatus (cell ID). The base station apparatus located in the periphery of the indoor base station apparatus 200 may be a fixed base station apparatus or another indoor base station apparatus. The base station apparatus located in the periphery of the indoor base station apparatus 200 may be a single base station apparatus or plural base station apparatuses. In a case where the peripheral cell information receiving part 202 is able to receive report information, the peripheral cell information receiving part 202 inputs the cell ID included in the report information as peripheral cell information to the below-described connection processing part 204.

Figure 6:
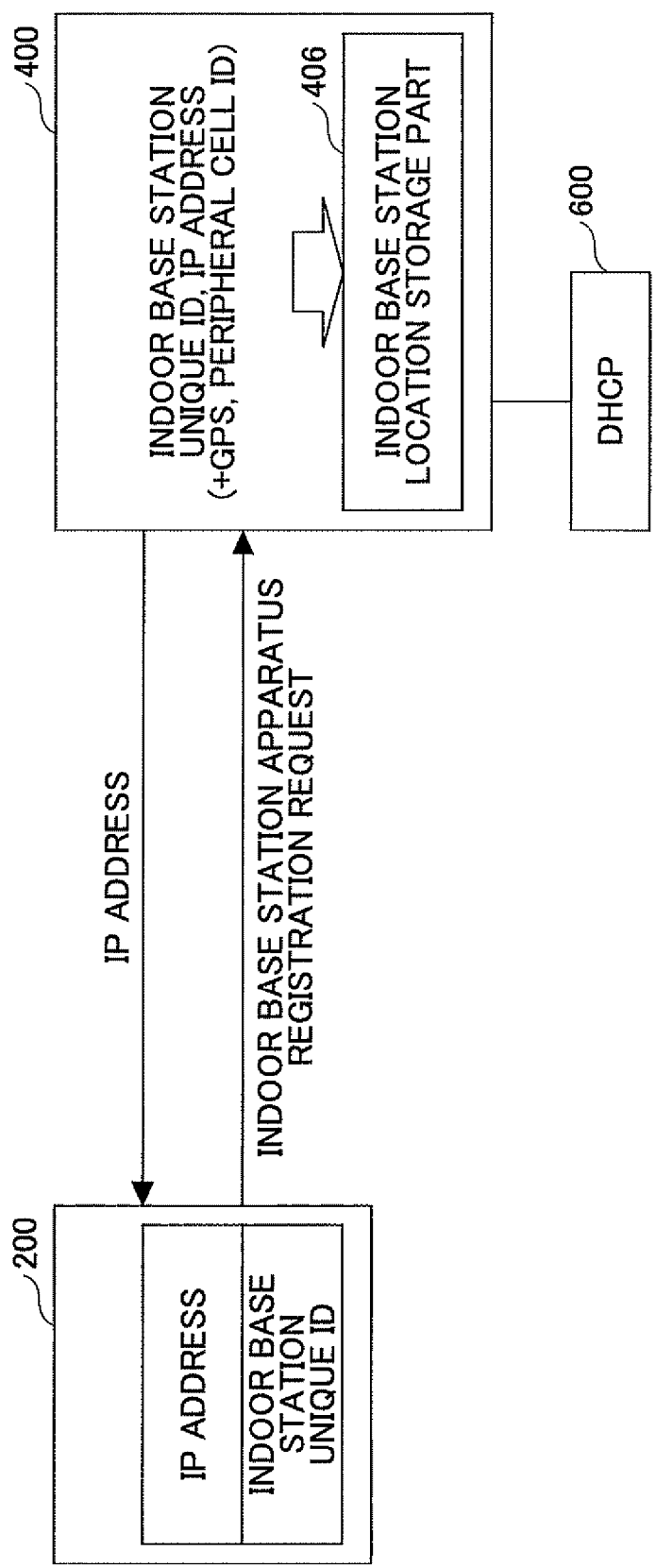
FIG. 6 is a schematic diagram for describing an operation of an indoor base station apparatus according to an embodiment of the present invention.

The indoor base station apparatus 200 further includes the connection processing part 204. The connection processing part 204 performs a connection process between the gateway apparatus 400. The connection process may include a connection process defined by IP sec. For example, in the connection process according to IP sec, an IP address is distributed from a DHCP server 600 as illustrated in FIG. 6. The distributed IP address is reported to the indoor base station apparatus 200 from the gateway apparatus 400. The connection process part 204 of the indoor base station apparatus 200 stores the reported IP address in the below-described storage part 208. Further, the connection processing part 204 requests registration of the location of the indoor base station apparatus 200 itself (indoor base station registration request) to the gateway apparatus 400. The indoor base station registration requests includes an ID unique to the indoor base station apparatus 200 (indoor base station unique ID) and an IP address of the indoor base station apparatus 200. In a case where peripheral cell information is input from the peripheral cell information receiving part 202, the connection processing part 204 may add the peripheral cell information into the indoor base station registration request and transmit the indoor base station registration request to the gateway apparatus 400. Furthermore, in a case where location information is input from the below-described GPS receiver 206, the connection processing part 204 may add the location information into the indoor base station registration request and transmit the indoor base station registration request to the gateway apparatus 400.

The gateway apparatus 400 stores the indoor base station unique ID and the IP address included in the indoor base station registration request transmitted from the indoor base station apparatus 200 in the indoor base station location storage part 406. Further, in a case where the indoor base station registration request includes location information identified by a GPS signal, the gateway apparatus 400 stores the location information in the indoor base station location storage part 406. Further, in a case where peripheral cell information is included in the indoor base station registration request, the cell ID included in the peripheral cell information is stored in the indoor base station location storage part 406.

The indoor base station apparatus 200 further includes the GPS receiver 206. The GPS receiver 206 receives a GPS signal(s) transmitted from a GPS satellite. In a case where the GPS receiver 206 receives a GPS signal, the GPS receiver 206 identifies the location of the indoor base station apparatus 200 based on the received GPS signal. The GPS receiver 206 inputs the location information of the identified indoor base station apparatus 200 to the connection processing part 204.

The indoor base station apparatus 200 further includes the storage part 208. The storage part 208 stores an ID unique to the indoor base station apparatus 200 (indoor base station unique ID). The MAC address of the indoor base station apparatus 200 may be used as the indoor base station unique ID. Alternatively, in a case where a U-SIM card is included in the indoor base station apparatus 200, an IMSI stored in the U-SIM card may be used as the indoor base station unique ID. Further, the storage part 208 also stores the IP address distributed by the DHCP server 600.

Next, the wireless terminal device 100 according to an embodiment of the present invention is described with reference to FIGS. 7 and 8.

The wireless terminal device 100 receives a cell ID reported (notified) from the indoor base station apparatus 200. Further, the wireless terminal device 100 requests location registration to the indoor base station apparatus 200. In this case, the wireless terminal device 100 may request location registration to the indoor base station apparatus 200 or the gateway apparatus 400. In other words, the location registration request from the wireless terminal device 100 may once be terminated at the indoor base station apparatus 200.

First, a case where the indoor base station apparatus 200 does not terminate the location registration request from the wireless terminal device 100 is described. The location registration request from the wireless terminal device 100 includes the wireless terminal device unique ID and the cell ID reported from the indoor base station apparatus 200. The gateway apparatus 400 stores the cell ID included in the location registration request transmitted from the wireless terminal device 100 and an IP address of the origin transmitting the IP packet including the location registration request in the wireless terminal location storage part 408. For example, the gateway apparatus 400 stores the cell ID as the information to be associated to the wireless terminal unique ID and stores the IP address of the wireless terminal device 100 as the IP address of the origin transmitting the location registration request. This method may be applied to the below-described case where the indoor base station apparatus 200 terminates the location registration request from the wireless terminal device 100.

Next, a case where the indoor base station apparatus 200 terminates the location registration request from the wireless terminal device 100 is described. The location registration request from the wireless terminal device 100 includes the wireless terminal device unique ID and the cell ID reported from the indoor base station apparatus 200. The gateway apparatus 400 stores the cell ID included in the location registration request transmitted from the wireless terminal device 100 and an IP address of the origin transmitting the IP packet including the location registration request in the wireless terminal location storage part 408. For example, the gateway apparatus 400 stores the cell ID as the information to be associated to the wireless terminal unique ID and stores the IP address of the indoor base station apparatus 200 as the IP address of the origin transmitting the location registration request.

In a case where the indoor base station apparatus 200 is able to receive location information identified by a GPS signal and/or peripheral cell information, the location information identified by the GPS signal and/or the peripheral cell information may be added in the location registration request regardless of whether the indoor base station 200 terminates the location registration request from the wireless terminal device 100. The peripheral cell information includes, for example, an identifier of a peripheral cell(s) located in the periphery of the wireless terminal device 100. The peripheral cell may be a cell covered by an outdoor base station or a cell covered by an indoor base station. From the aspect of identifying a location, it is preferable for the peripheral cell to be a cell covered by an outdoor base station. Accordingly, the gateway apparatus 400 can obtain necessary information from location registration information of a corresponding indoor base station apparatus 200 by searching through the indoor base station storage part 406 based on an IP address of the indoor base station apparatus 200. In this case where location information identified by a GPS signal or peripheral outdoor cell information that correspond to the indoor base station apparatus 200 are stored in the indoor base station storage part 406, the location information identified by the GPS signal or the peripheral outdoor cell information can be obtained. Since the IP address of the indoor base station apparatus 200 is the IP address distributed by the DHCP server 600 according to IP sec, the IP address can be used as information for identifying the indoor base station apparatus 200. Accordingly, the location information identified by the GPS signal or the peripheral cell information can be associated to the indoor base station unique ID or to the IP address of the indoor base station apparatus 200.

The wireless terminal device 100 reports location information in response to a request for obtaining location information (location information obtaining request) from the communications network 300 when transmitting an emergency alert. In a case where the wireless terminal device 100 is located in an area covered by the indoor base station apparatus 200, the wireless terminal device 100 may be in an environment unable to receive GPS signals or peripheral cell information of outdoor cells located in the periphery of the wireless terminal device 100 even though the location information obtaining request is sent from the communications network 300. Likewise, the indoor base station apparatus 200 may also be in an environment unable to receive GPS signals or peripheral cell information of outdoor cells located in the periphery of the indoor base station apparatus 200. In these cases, the actual physical location of the wireless terminal device 100 and/or the indoor base station apparatus 200 cannot be identified even if the virtual location of the wireless terminal device 100 and/or the indoor base station apparatus 200 according to the IP address can be obtained.

Figure 7:
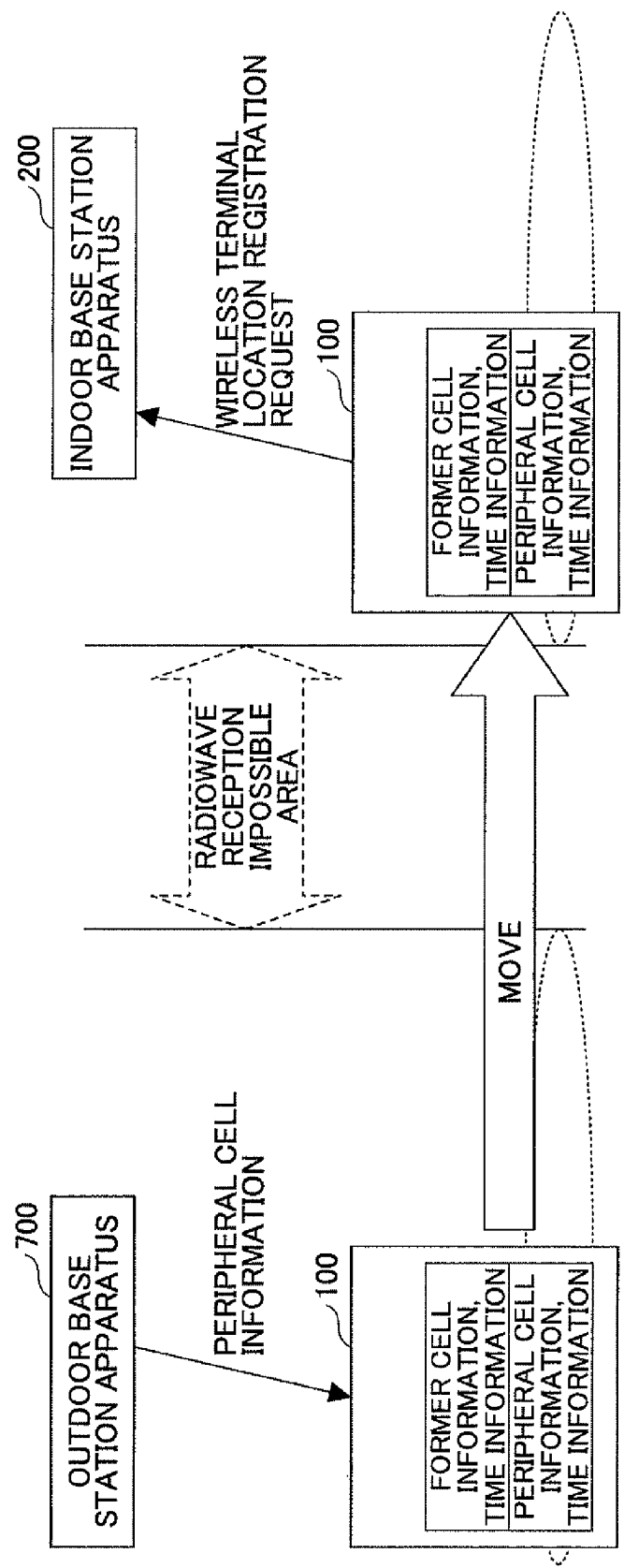
FIG. 7 is a schematic diagram for describing an operation of a wireless terminal device according to an embodiment of the present invention.
Figure 8:
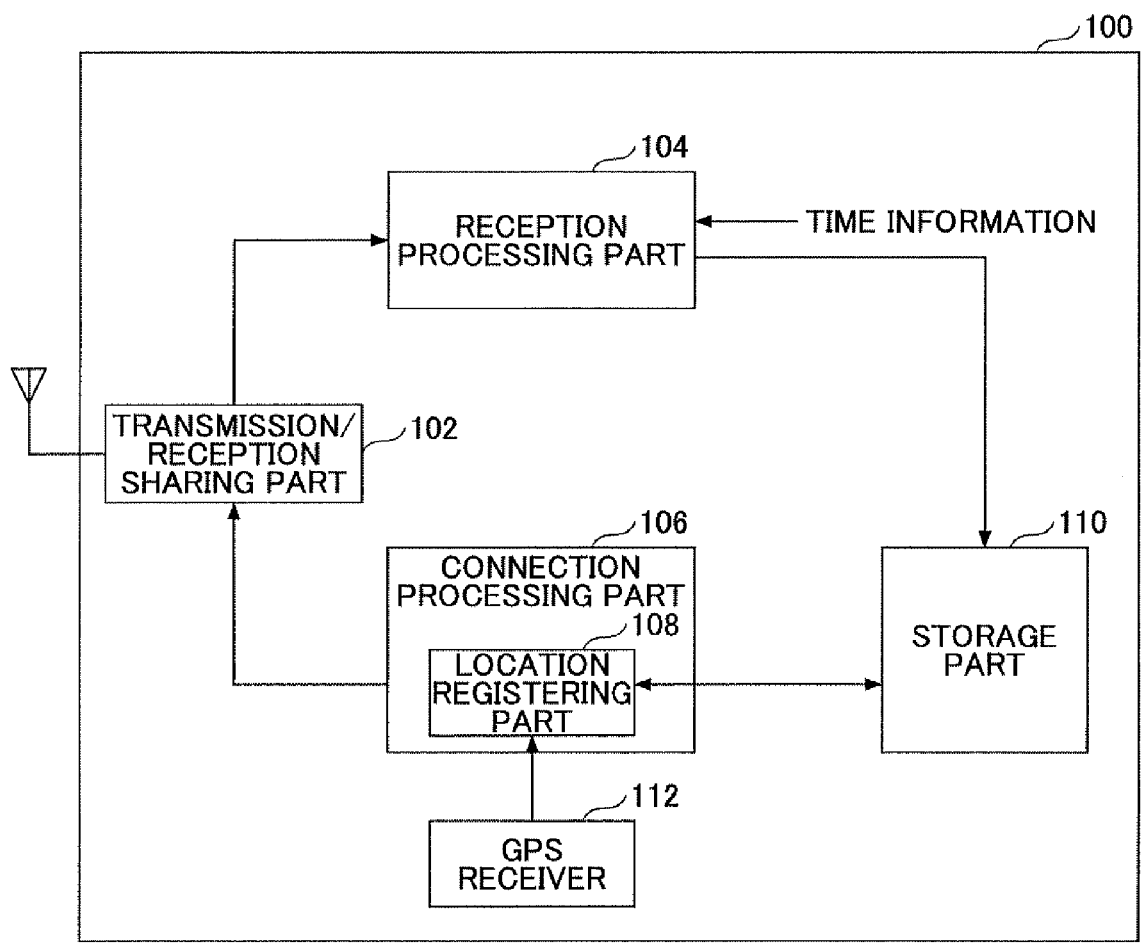
FIG. 8 is a block diagram illustrating a wireless terminal device according to an embodiment of the present invention.
Figure 9:
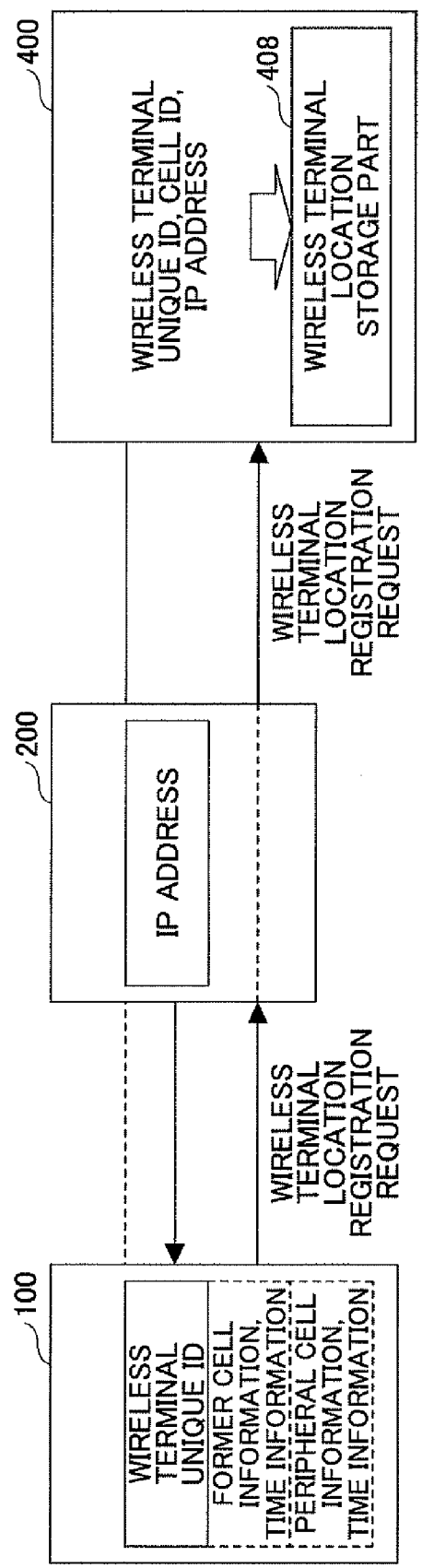
FIG. 9 is a schematic diagram for describing an operation of a wireless terminal device according to an embodiment of the present invention.

Therefore, as illustrated in FIG. 7, the wireless terminal device 100 according to an embodiment of the present invention maintains the newest (latest) obtained position information status and time information. The newest obtained position information status includes former cell information and/or peripheral cell information obtained before registering its position to the indoor base station apparatus 200. Although FIG. 7 illustrates the wireless terminal device 100 having both former cell information and peripheral cell information obtained from an outdoor base station apparatus 700, the wireless terminal device 100 may hold either one of the former cell information and the peripheral cell information. For example, by having a base station apparatus (e.g., outdoor base station apparatus 700) alert (notify) the time information to the wireless terminal device 100, the wireless terminal device 100 can automatically correct time information. Accordingly, the wireless terminal device 100 can be synchronized with time information managed by the mobile communications network in the communications network 300. More specifically, second order synchronization can be achieved between the wireless terminal device 100 and the mobile communications network. By synchronizing the wireless terminal device 100 and the mobile communications network in an order of seconds, the error created by the synchronization does not significantly affect alerting of an emergency. That is, because the physical traveling distance for a period of a few seconds is short, deviance of location due to error created by such few seconds does not affect alerting of an emergency. In other words, obtained location information corresponding to time information in the wireless terminal device 100 can be used as reliable location information.

Thus, time information is used for determining the validity (usability) of former cell information and/or peripheral cell information. For example, the indoor base station apparatus 200 or the gateway apparatus 400 can determine the validity of former cell information and/or peripheral cell information based on time information corresponding to former cell information and/or peripheral cell information reported from the wireless terminal device 100. More specifically, the indoor base station apparatus 200 or the gateway apparatus 400 refers to time information corresponding to former cell information and time information corresponding to peripheral cell information, to thereby determine whether the former cell information and/or the peripheral cell information is valid. The indoor base station apparatus 200 or the gateway apparatus 400 determines validity of the former cell information and/or the peripheral cell information in view of a case where the wireless terminal device 100 travels through an area unable to receive radiowaves (radiowave reception impossible area) for more than a predetermined period of time when moving from an area covered by the outside base station apparatus 700 to an area covered by the indoor base station apparatus 200. For example, in a case where the wireless terminal device 100 travels through the radiowave reception impossible area for a few seconds (that is, within a predetermined period of time), the gateway apparatus 400 determines that the wireless terminal device 100 has moved from a base station not far from the indoor base station apparatus 200.

On the other hand, in a case where a period greater than the predetermined period of time has elapsed according to the time information included in the location registration request, the gateway apparatus 400 determines that the wireless terminal device 100 has moved from a base station far from the indoor base station apparatus 200. In this case, the gateway apparatus 400 determines that the former cell information and/or the peripheral cell information included in the location registration request cannot be used. For example, the gateway apparatus 400 determines that the location of the wireless terminal device 100 cannot be identified based on the former cell information and/or the peripheral cell information included in the location registration request. One example of a case where a period greater than the predetermined period of time elapses according to the time information included in the location registration request is a case where the power of the wireless terminal device 100 is turned on after being moved to an area covered by the indoor base station apparatus 200 in a turned off state.

Next, the wireless terminal device 100 according to an embodiment of the present invention is described with reference to FIG. 8. The wireless terminal device 100 includes a reception processing part 104. The reception processing part 104 receives report information (notification information) from a base station apparatus (e.g., a fixed outdoor base station apparatus, an indoor base station apparatus) covering an area in which the wireless terminal device 100 itself is located. The report information includes, for example, an ID (cell ID) of a cell covered by the base station apparatus (e.g., a fixed outdoor base station apparatus, an indoor base station apparatus). In a case where the reception processing part 104 receives report information, the reception processing part 104 stores the cell ID included in the report information as former cell information together with time information corresponding to the former cell information in the below-described storage part 110. Further, the reception processing part 104 receives report information transmitted from a peripheral base station apparatus located in the periphery of the base station apparatus covering the area in which the wireless terminal device 100 itself is located. For example, the report information includes an ID (cell ID) of a cell that is covered by the peripheral base station apparatus. The peripheral base station apparatus may be a fixed base station apparatus or an indoor base station apparatus. The peripheral base station apparatus may be a single base station apparatus or plural base station apparatuses. In a case where the reception processing part 104 receives report information, the reception processing part 104 stores the cell ID included in the report information as peripheral cell information together with time information corresponding to the peripheral cell information in the below-described storage part 110. Further, the reception processing part 104 receives an IP address distributed from the DHCP server 600. The reception processing part 104 stores the received IP address in the below-described storage part 110.

The wireless terminal device 100 further includes a connection processing part 106. The connection processing part 106 performs a connection process between the indoor base station apparatus 200.

The wireless terminal device 100 further includes a location registering part 108. The location registering part 108 requests registration of the location of the wireless terminal device 100 itself (wireless terminal location registration request) to the indoor base station apparatus 200 or the gateway apparatus 400. The wireless terminal location registration request includes an ID unique to the wireless terminal device 100 (wireless terminal unique ID), a cell ID, and an IP address of the wireless terminal device 100. The wireless terminal location registration request may include location information identified according to a GPS signal received by the wireless terminal device 100. Further, the wireless terminal location registration request may also include former cell information and time information corresponding to the former cell information of the wireless terminal device 100. Further, the wireless terminal location registration request may also include peripheral cell information and time information corresponding to the peripheral cell information of the wireless terminal device 100. The information included in the wireless terminal location registration request are stored in the wireless terminal location storage part 408 of the gateway apparatus 400.

The wireless terminal device 100 further includes a GPS receiver 112. The GPS receiver 112 receives a GPS signal(s) transmitted from a GPS satellite. In a case where the GPS receiver 112 receives a GPS signal, the GPS receiver 112 identifies the location of the wireless terminal device 100 based on the received GPS signal. The GPS receiver 112 inputs the location information of the identified wireless terminal device 100 to the connection processing part 108.

The wireless terminal device 100 further includes the storage part 110. The storage part 110 stores an ID unique to the wireless terminal device 100 (wireless terminal unique ID). The MAC address of the wireless terminal device 100 may be used as the wireless terminal unique ID. Alternatively, in a case where a U-SIM card is included in the wireless terminal device 100, an IMSI stored in the U-SIM card may be used as the wireless terminal unique ID. Further, the storage part 110 also stores the IP address distributed by the DHCP server 600. Further, the storage part 110 also stores the IP address input from the reception processing part 104. Further, the storage part 110 also stores the former cell information and its corresponding time information received from the reception processing part 104. Further, the storage part 110 also stores the peripheral cell information and its corresponding time information received from the reception processing part 104.

Figure 10:
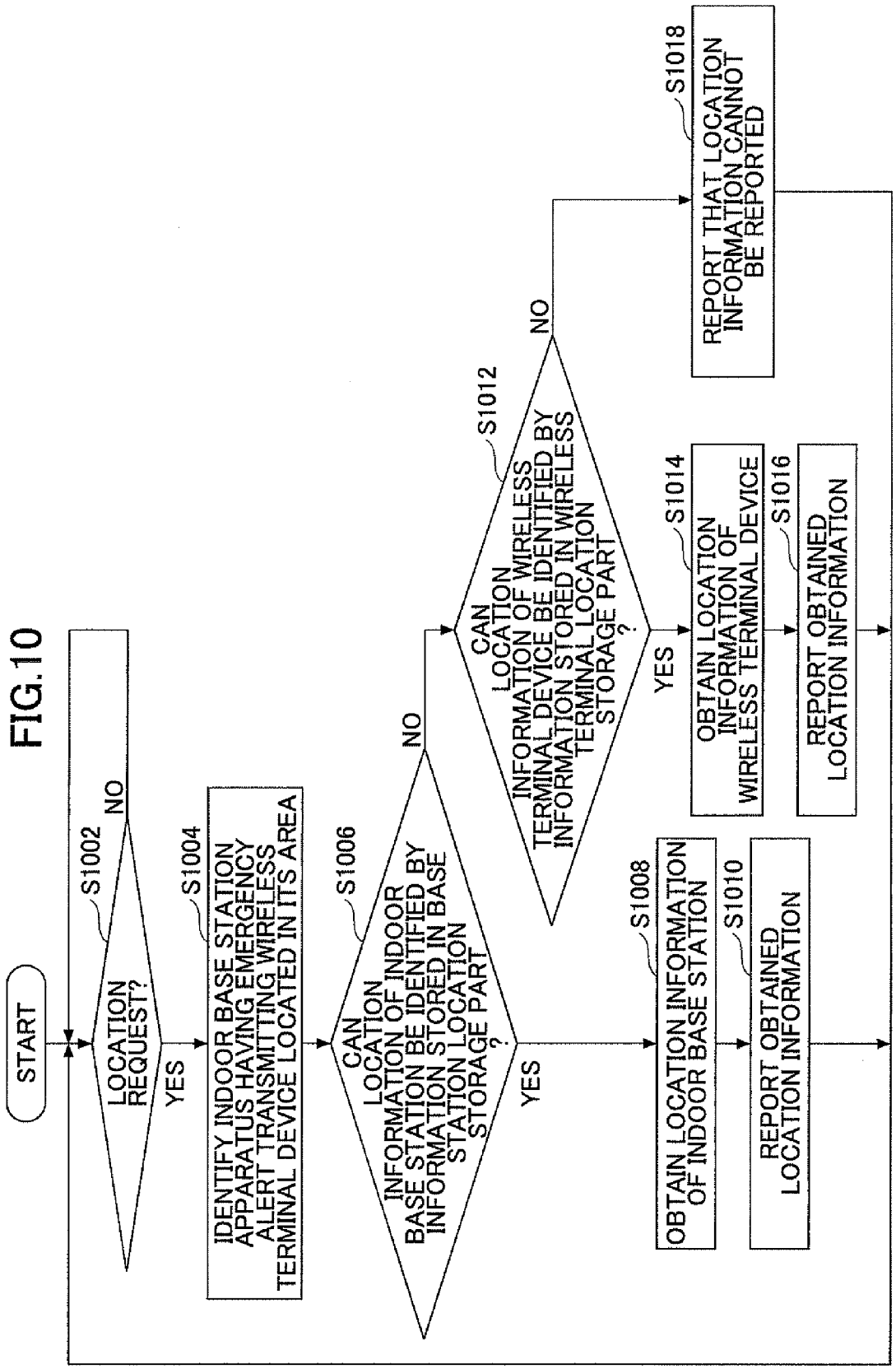
FIG. 10 is a flowchart illustrating an operation of a gateway apparatus according to an embodiment of the present invention.

Next, an operation of the gateway apparatus 400 according to an embodiment of the present invention is described with reference to FIG. 10.

The gateway apparatus 400 determines whether obtaining of location information is requested (location request) (Step S1002). For example, the emergency alert controlling part 410 determines whether a location request is transmitted from the line/packet switching apparatus 500.

In a case where obtaining of location information is requested (Yes in Step S1002), the gateway apparatus 400 identifies the indoor base station apparatus 200 covering an area in which a wireless terminal device 100 transmitting an emergency alert is located (Step S1004). For example, the emergency alert controlling part 410 identifies the indoor base station apparatus 200 according to the wireless terminal unique ID and the cell ID associated to the wireless terminal unique ID. In a case where obtaining of location information is not requested (No in Step S1002) the operation returns to Step S1002. Accordingly, the gateway apparatus 400 stands by for the location request.

Then, the gateway apparatus 400 determines whether location information of the identified indoor base station apparatus 200 can be obtained according to information corresponding to the identified indoor base station apparatus 200 stored in the indoor base station location storage part 406 (Step S1006). For example, in a case where GPS identified location information (i.e. location information identified by a GPS signal) corresponding to the identified indoor base station 200 is stored in the indoor base station location storage part 406, the gateway apparatus 400 determines that the location information of the identified indoor base station apparatus 200 can be obtained. Further, in a case where peripheral cell information corresponding to the identified indoor base station 200 is stored in the indoor base station location storage part 406, the gateway apparatus 400 determines that location information of the identified indoor base station apparatus 200 can be obtained.

In the case where the gateway apparatus 400 determines that location information of the identified indoor base station apparatus 200 can be obtained based on the information corresponding to the identified indoor base station apparatus 200 (Yes in Step S1006), the gateway apparatus 400 obtains the location information (Step S1008). For example, the emergency alert controlling part 410 obtains location information identified from the GPS signal. Further, the emergency alert controlling part 410 may also estimate location information based on the peripheral cell information corresponding to the identified indoor base station apparatus 200.

The gateway apparatus 400 reports the obtained location information (Step S1010). For example, the emergency alert controlling part 410 reports the obtained location information to the line/packet switching apparatus 500.

In Step S1006, in a case where the gateway apparatus 400 determines that location information of the identified indoor base station apparatus 200 cannot be obtained based on the information corresponding to the identified indoor base station apparatus 200 in the indoor base station location storage part 406 (No in Step S1006), the gateway apparatus 400 determines whether location information of the wireless terminal device 100 can be obtained according to information corresponding to the wireless terminal device 100 stored in the wireless terminal location storage part 408 (Step S1012). For example, in a case where GPS identified location information (i.e. location information identified by a GPS signal) corresponding to the wireless terminal device 100 is stored in the wireless terminal location storage part 408, the gateway apparatus 400 determines that the location information of the wireless terminal device 100 can be obtained. Further, in a case where former cell information along with its corresponding time information and/or peripheral cell information along with its corresponding time information that correspond to the wireless terminal device 100 are stored in the wireless terminal location storage part 408, the gateway apparatus 400 determines whether a movable distance of the wireless terminal device 100 (distance in which the wireless terminal device 100 can move after a predetermined period has elapsed from the time indicated in the time information) is within a radius of the cell of the indoor base station 200 according to the time information stored in the wireless terminal location storage part 408. In a case where the gateway apparatus 400 determines that the movable distance is within the radius of the cell of the indoor base station 200, the gateway apparatus 400 determines that location information of the wireless terminal device 100 can be obtained. In a case where a some amount of time has elapsed from the time indicated in the time information (i.e. a case where the movable distance is beyond the radius of the cell of the indoor base station apparatus 200), the gateway apparatus 400 may determine whether to obtain location information based on former cell information or obtain location information based on peripheral cell information depending on how much the movable distance surpasses the radius of the cell. For example, in a case where the distance surpassing the cell radius is no less than a predetermined threshold, the location information based on former cell location information may lack precision. Thus, in this case, the gateway apparatus 400 may obtain location information based on peripheral cell information. In this example, the predetermined threshold is a distance determined to ensure precision of location information in a case of obtaining location information based on former cell information. Although this example describes a case where depending on how much the movable distance surpasses the cell radius, the obtaining of location information may be determined depending on how much time has elapsed from the time required in traveling the cell radius.

In a case where the gateway apparatus 400 determines that location information of the wireless terminal device 100 can be obtained based on information corresponding to the wireless terminal device 100 stored in the wireless terminal location storage part 408 (Yes in Step S1012), the gateway apparatus 400 obtains the location information of the wireless terminal device 100 (Step S1014). For example, the emergency alert controlling part 410 obtains location information identified from the GPS signal. Further, the emergency alert controlling part 410 may also estimate location information based on the peripheral cell information corresponding to the wireless terminal device 100.

Then, the gateway apparatus 400 reports the obtained location information (Step S1016). For example, the emergency alert controlling part 410 reports the obtained location information to the line/packet switching apparatus 500.

In Step S1012, in a case where the gateway apparatus 400 determines that location information of the wireless terminal device 100 cannot be obtained based on the information corresponding to the wireless terminal device 100 stored in the wireless terminal location storage part 408 (No in Step S1012), the gateway apparatus 400 reports that location information of the wireless terminal device 100 cannot be obtained (Step S1018). For example, the emergency alert controlling part 410 reports that location information of the wireless terminal device 100 cannot be obtained to the line/packet switching apparatus 500.

According to the above-described embodiment of the present invention, the gateway apparatus 400 determines whether location information can be obtained starting by referring to the information stored in the indoor base station location storage part 406 and then by referring to the information stored in the wireless terminal location storage part 408. This is because it is considered that location information identified by information stored in the indoor base station location storage part 406 is more reliable compared to the information stored in the wireless terminal location storage part 408. Accordingly, reliable location information can be reported to an emergency alert receiving institute.

Figure 11:
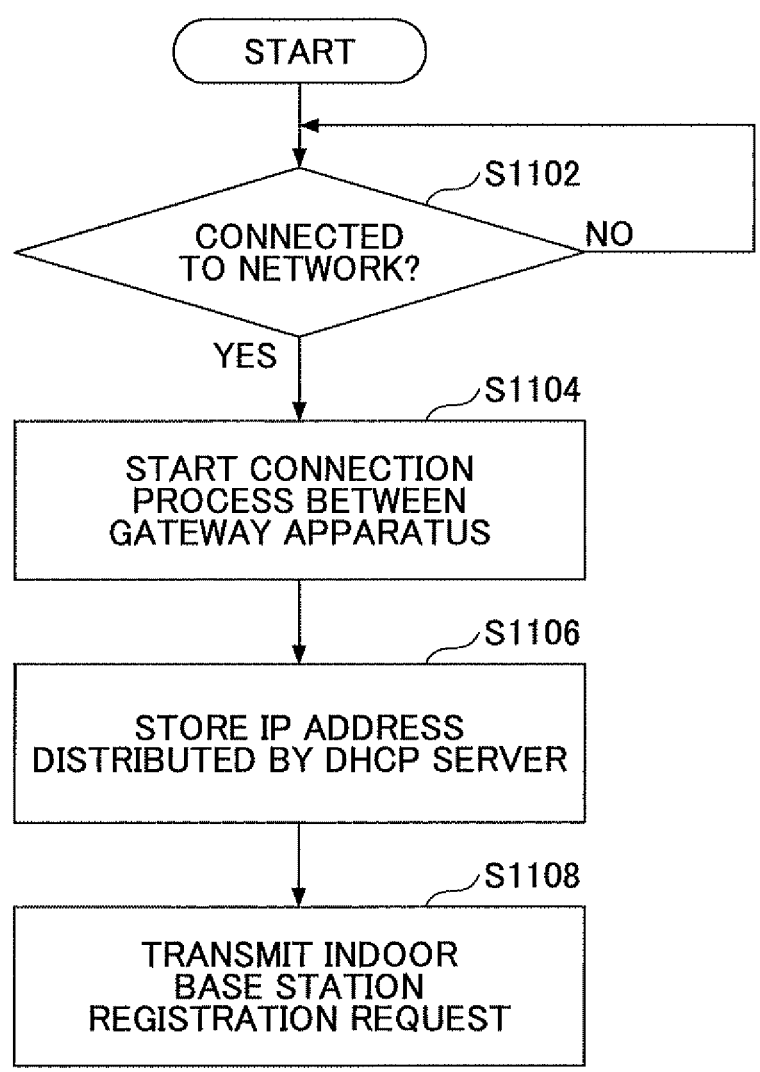
FIG. 11 is a flowchart illustrating an operation of an indoor base station apparatus according to an embodiment of the present invention.

Next, an operation of the indoor base station apparatus 200 according to an embodiment of the present invention is described with reference to FIG. 11.

The indoor base station apparatus 200 determines whether itself is connected to the communications network 300 (Step S1102). For example, the connection processing part 204 determines whether the indoor base station apparatus 200 itself is connected to the gateway apparatus 400 via the communications network 300.

In a case where the indoor base station apparatus 200 determines that the indoor base station apparatus 200 itself is not connected to the communications network 300 (No in Step S1102) the indoor base station apparatus 200 stands by for the connection. On the other hand, in a case where the indoor base station apparatus 200 determines that the indoor base station apparatus 200 itself is connected to the communications network 300 (Yes in Step S1102), the indoor base station apparatus 200 performs a connection process between the gateway apparatus 400 (Step S1104). For example, the connection process may be defined according to IP sec.

The indoor base station apparatus 200 stores an IP address distributed from the DHCP server 600 (Step S1106). For example, the connection processing part 204 stores the IP address distributed from the DHCP server 600 in the storage part 208.

The indoor base station apparatus 200 transmits an indoor base station registration request to the gateway apparatus 400 (Step S1108). The indoor base station registration request includes the IP address of the indoor base station apparatus and the indoor base station unique ID. Further, in a case where peripheral cell information is obtained from the peripheral cell information receiving part 202, the peripheral cell information may be included in the indoor base station registration request. Further, in a case where location information is obtained from the GPS receiver 206, the location information input from the GPS receiver 206 may be included in the indoor base station registration request.

Figure 12:
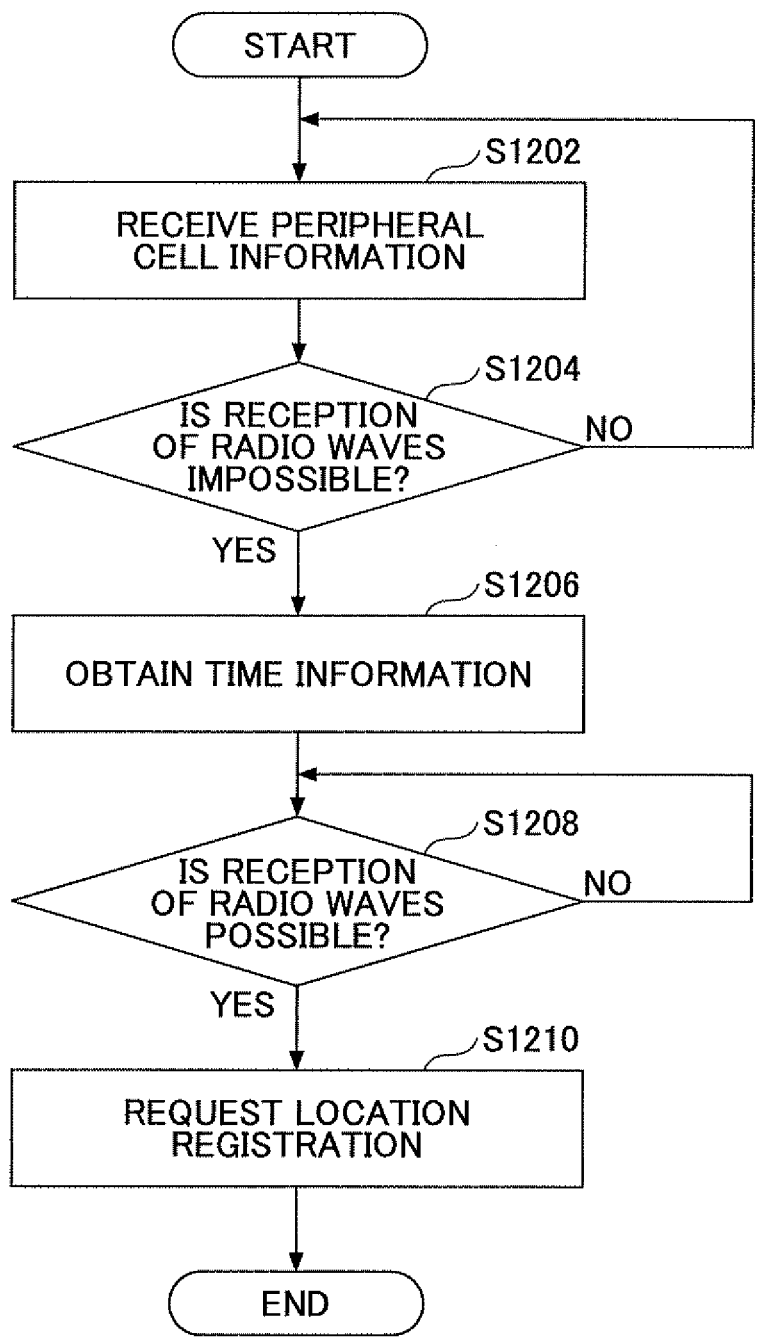
FIG. 12 is a flowchart illustrating an operation of a wireless terminal device according to an embodiment of the present invention.

Next, an operation of the wireless terminal device 100 according to an embodiment of the present invention is described with reference to FIG. 12.

The wireless terminal device 100 receives peripheral cell information (Step S1202). For example, the wireless terminal device 100 obtains peripheral cell information by receiving report information transmitted from a cell other than the cell in which the wireless terminal device 100 is located. The report information includes a cell ID of a base station apparatus transmitting the report information. In this example, the base station apparatus may be a base station apparatus fixed to a predetermined area (fixed base station apparatus) The report information is input to the reception processing part 104 via a transmission/reception sharing part 102.

The wireless terminal device 100 determines whether reception of radiowaves is impossible (Step S1204). For example, the reception processing part 104 determines whether radiowaves transmitted from a base station apparatus in the cell in which the wireless terminal device 100 is located can be received.

In a case where the wireless terminal device 100 determines that reception of radiowaves is not impossible (No in Step S1204), the operation returns to Step S1202. The reception processing part 104 continues to receive peripheral cell information. On the other hand, in a case where the wireless terminal device 100 determines that reception of radiowaves is impossible (Yes in Step S1204), the wireless terminal device 100 obtains time information (Step S1206). For example, the reception processing part 104 obtains the time information and stores the time information together with corresponding peripheral cell information in the storage part 110. The reception processing part 104 may obtain the time information and store the time information together with cell information indicating the cell in which the wireless terminal device 100 is located in the storage part 110. The cell information indicating the cell in which the wireless terminal device 100 is located is stored as former cell information in the storage part 110. Thereby, the gateway apparatus 400 can determined validity (usability) of the former cell information and/or the peripheral cell information based on the corresponding time information.

Then, the wireless terminal device 100 determines whether reception of radiowaves is possible (Step S1208). For example, the reception processing part 104 determines whether it is possible to receive radiowaves transmitted from a base station apparatus different from the base station apparatus located in the area in which the wireless terminal device 100 was formerly located. The different base station apparatus may be an indoor base station apparatus.

In a case where the wireless terminal device 100 determines reception of the radiowaves is not possible (No in Step S1208), the operation returns to Step S1208. Then, the wireless terminal device 100 stands by for receiving radiowaves.

On the other hand, in a case where the wireless terminal device 100 determines reception of the radiowaves is possible (Yes in Step S1208) the wireless terminal device 100 requests registration of the location of the wireless terminal device 100 itself (wireless terminal location registration request) to the indoor base station apparatus 200 or the gateway apparatus 400 (Step S1210). The wireless terminal location registration request includes a wireless terminal unique ID, a cell ID, and an IP address of the wireless terminal device 100. The wireless terminal location registration request may also include location information identified according to a GPS signal received by the wireless terminal device 100. Further, the wireless terminal location registration request may include peripheral cell information and corresponding time information received by the wireless terminal device 100. Further, the wireless terminal location registration request may also include former cell information of the wireless terminal device 100 and corresponding time information. In a case where reception of radiowaves becomes possible for the wireless terminal device 100, the wireless terminal device 100 may determine whether the received radiowaves are from an indoor base station apparatus 200. For example, the wireless terminal device 100 may determine whether the base station apparatus is an indoor base station apparatus based on the cell ID carried by the received radiowaves. Further, in a case where the wireless terminal device 100 determines that the received radiowaves are from an indoor base station apparatus 200, the wireless terminal device 100 may report its peripheral cell information and corresponding time information.

Figure 13:
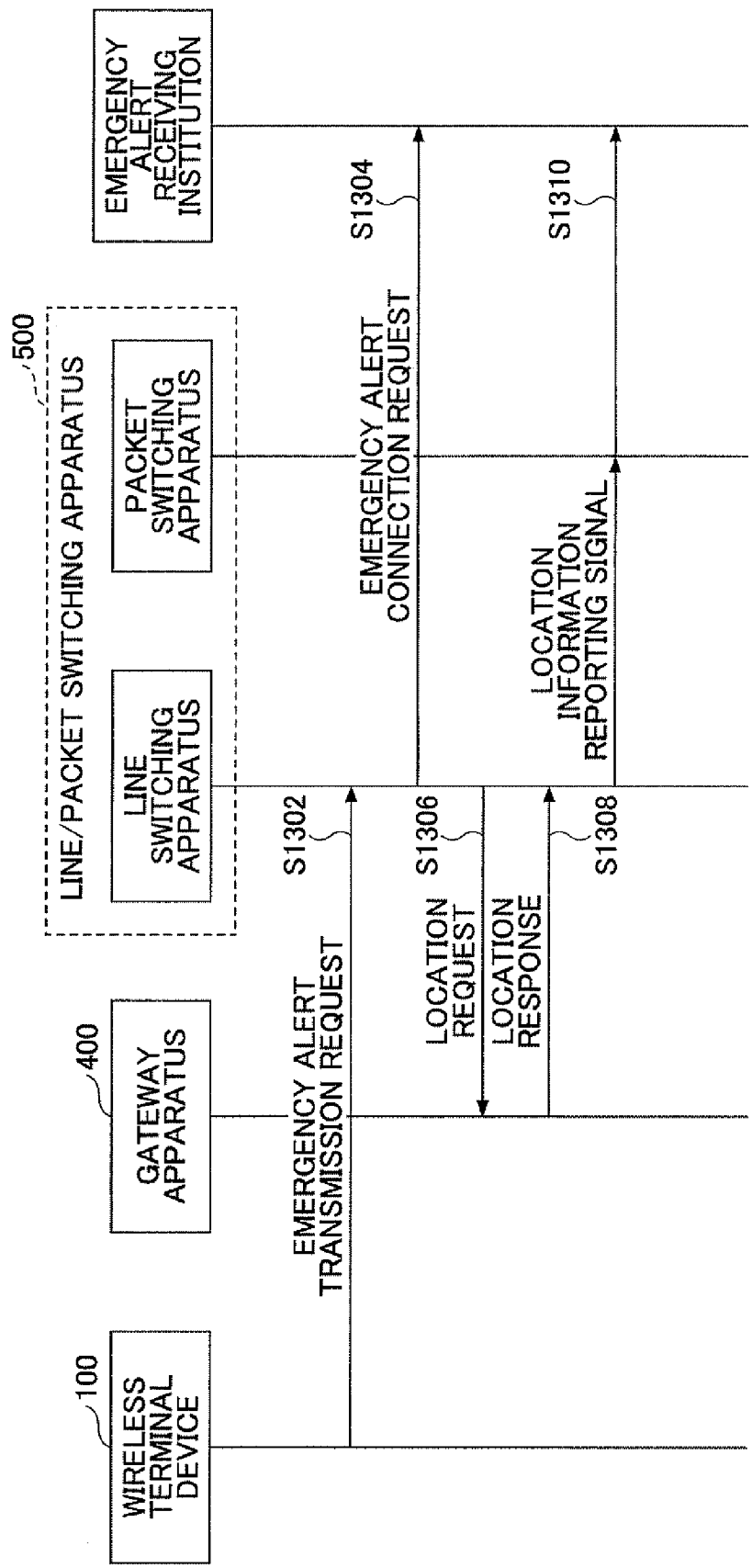
FIG. 13 is a flowchart illustrating an operation of a wireless communications system according to an embodiment of the present invention.

Next, the wireless communications system 1000 according to an embodiment of the present invention is described with reference to FIG. 13.

Based on the status of location information registered in the indoor base station apparatus 200, the wireless communications system 1000 performs the following operation in a case where an emergency alert is transmitted from the wireless terminal device 100.

The wireless terminal device 100 requests transmission of an emergency alert by sending an emergency alert transmission request. The emergency alert transmission request is received by a line switching apparatus included in the line/packet switching apparatus 500 (Step S1302).

The line switching apparatus requests emergency alert connection to the emergency alert receiving institution according to the received emergency alert transmission request (Step S1304). In addition, the line switching apparatus requests a locating process (location information obtaining process) to the gateway apparatus 400 according to the received emergency alert transmission request (Step S1306).

The gateway apparatus 400 performs the locating process according to the location request from the line switching apparatus. The gateway apparatus 400 transmits a location response to the line switching apparatus (Step S1308). In a case where the locating process is performed, the gateway apparatus 400 transmits a location response including obtained location information to the line switching apparatus. In a case where the locating process could not be performed, a location response including information indicating that the locating process could not be performed is transmitted to the line switching apparatus.

The line switching apparatus receives the location response transmitted from the gateway apparatus 400 and transmits the location response to the packet switching apparatus as location information reporting signal. The packet switching apparatus transmits the location information reporting signal received from the line switching apparatus to the emergency alert receiving institution (Step S1310).

With the above-described embodiment of the wireless communications system 1000, a mobile communications carrier can report location information with high accuracy even in a case where an emergency alert is transmitted from a wireless terminal device 100 located in an area covered by an indoor base station apparatus 200 having a tendency of moving from one place to another rather than being fixed to a predetermined area.

Further, the location of the indoor base station apparatus installed in an environment which can neither receive GPS signals nor obtain peripheral cell information can be identified.

Although the above-described embodiment of the gateway apparatus 400 is described as including the indoor base station location storage part 406 and the wireless terminal location storage part 408, the indoor base station location storage part 406 and the wireless terminal location storage part 408 may be an indoor base station location storage server and a wireless terminal location storage server installed outside of the gateway apparatus 400.

Further, the present invention is not limited to these embodiments, but various variations and modifications may be made without departing from the scope of the present invention.

The present application is based on Japanese Priority Application No. 2008-066197 filed on Mar. 14, 2008, with the Japanese Patent Office, the entire contents of which are hereby incorporated by reference.

What is claimed is:

1. An indoor base station apparatus comprising:
    a peripheral cell information obtaining unit configured to obtain peripheral cell information;
    a location information obtaining part configured to obtain location information from a base station located in a periphery of the indoor base station in a case where the indoor base station apparatus is located in a femtocell that cannot receive signals from a communications network or an outdoor cell, the location information indicative of a location in which the indoor base station apparatus is located; and
    a location registration requesting part configured to transmit a location registration request to an upper level apparatus;
    wherein when the location information obtaining part obtains the location information, the location registration requesting part transmits the location registration request including the obtained location information;
    wherein the location information obtaining part is configured to determine the location of the indoor base station apparatus based on a first time data included in the location information of the indoor base station apparatus and a second time data included in the peripheral cell information.

2. The indoor base station apparatus as claimed in claim 1, wherein the location registration request includes an IP address assigned to the indoor base station apparatus.

3. The indoor base station as claimed in claim 1, further comprising:
    a GPS receiving part configured to receive a GPS signal transmitted from a GPS satellite;
    wherein the location information obtaining part is configured to obtain the location information based on the received GPS signal.

4. The indoor base station as claimed in claim 1,
    wherein the peripheral cell information includes an identifier for identifying a cell from which the peripheral cell information is obtained;
    wherein the location information obtaining part is configured to estimate the location information based on the peripheral cell information.

* * * * *